Sept. 28, 1937.  P. BLUM ET AL  2,094,289

DOUGH DIVIDING AND ROUNDING MACHINE

Filed July 9, 1935  6 Sheets-Sheet 4

Inventors:
Peter Blum
and Franz Peter Blum
by *Karl Viertel*
Atty.

Sept. 28, 1937. P. BLUM ET AL 2,094,289
DOUGH DIVIDING AND ROUNDING MACHINE
Filed July 9, 1935 6 Sheets-Sheet 5

Inventors:
Peter Blum
and Franz Peter Blum
by *Karl Viertel*
Atty.

Patented Sept. 28, 1937

2,094,289

UNITED STATES PATENT OFFICE 2,094,289

DOUGH DIVIDING AND ROUNDING MACHINE

Peter Blum and Franz Peter Blum, Halle-Saale, Germany

Application July 9, 1935, Serial No. 30,430
In Germany May 9, 1934

13 Claims. (Cl. 107—20)

Our invention relates to machines for dividing and rounding dough, in which batches of dough after having been placed by the operator on the working table of the machine, are successively pressed and divided into a number of portions of practically equal weight, whereafter those portions are rounded so as to present balls of uniform size, which when baked are known as "rolls".

The invention relates more especially to improvements in dividing and rounding machines of the more advanced type, in which all the work connected with the pressing, dividing and rounding of the dough is performed in the machine by mechanical force.

The various objects aimed at by this invention and the advantages obtained will be fully understood by reviewing still more in detail the manner of operation of machines of the type set forth, as described for instance in United States Patents 1,303,454 (Bertram) and 1,851,328 (Rausch).

With those machines, which are often euphemistically called in the trade "automatic", by means of suitable controls, derived from the driving shaft, the several operations—such as closing the press mould, dividing the dough into portions and rounding the latter are indeed performed automatically in one continuous course of operations, and the main driving shaft of the machine is thereupon automatically declutched at the finish of each complete working process; see page 1 lines 10—12 of Patent 1,851,328 (Rausch) and claim 1 of Patent 1,303,434 (Bertram),—see also page 1, lines 39—55.

Stopping the machine to run—after having delt with one batch of dough-means, that the machine must be re-started by the operator for each of the following batches of dough, that is in practice about 3 times per minute.

Inherent to this manner of working the machine are a number of drawbacks, known in detail to practitioners, which, briefly defined, comprise constant strain on the operator's attention, calling for greater mental and physical concentration, speedy wear and tear of all those machine parts and mechanisms, including clutches, cams, levers, etc., which become disengaged, and must be re-accelerated in speedy succession, high consumption of power, reduced average working speed and reduced output of the machine.

The principal object of this invention is to overcome the said drawbacks by providing a dough dividing and rounding machine of improved design, which needs not to be restarted by the operator in speedy succession but continues to run after each complete working process, and is self-acting in a higher degree than machines known before.

In connection therewith the invention aims at thus re-designing and structurally improving dough dividing and rounding machines of the type set forth, that the mould within which the dough is divided and rounded is opened immediately after the rounding operation is finished.

Attention is directed to the fact, that with known dough dividing and rounding machines the mould is opened after a fixed interval no matter whether the rounding operation of the machine lasts all through its fullest possible term or is adjusted for and finished within a shorter period of time.

Another important feature of the invention consists in the provision of automatic controlling and safety devices so designed and cooperatively interconnected with the driving mechanism of the machine, that mischief and accidents, which may result from casual hindrances and irregularities in charging in due course a new batch of dough into the machine, or from failing to timely withdraw the rounded pieces of dough from the machine, which accidents may endanger the operator's life and will at least interfere with the proper dividing and rounding of the dough, are eliminated.

The nature and scope of the invention are briefly outlined in the appended claims and will be more fully understood by the following specification taken together with the accompanying drawings, in which

Figure 1:
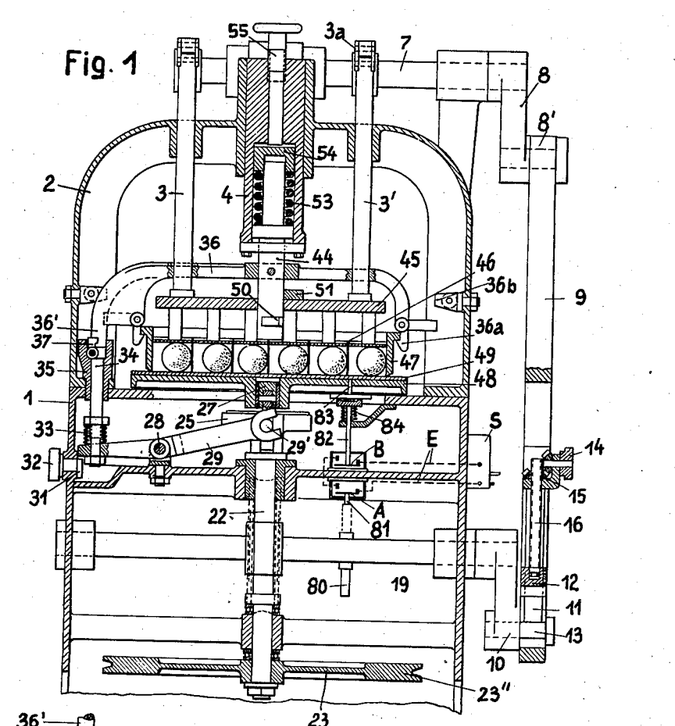
Fig. 1 is a section taken vertically and along the central axis of symmetry through a dough dividing and rounding machine structurally improved according to this invention and being shown by way of an example.
Figures 2, 2A, 2B, 4:
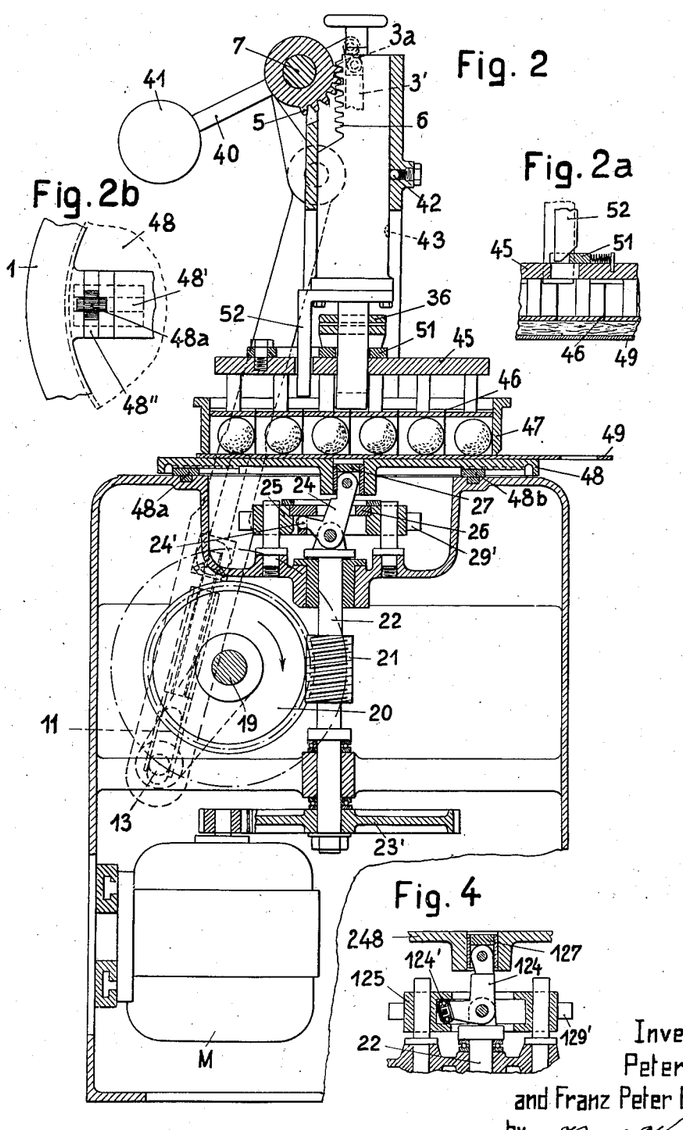
Fig. 2 is a section vertically taken through the machine at right angles to the section shown in Fig. 1.
Fig. 2a is a fragmentary section illustrating the releasing of the automatic locking mechanism cooperatively interconnecting the dividing knife and the press plate of the machine.
Fig. 2b is a fragmentary plan showing one of the cross shaped guide members enabling the rounding table to perform gyratory movements.
Fig. 4 is a fragmentary cross sectional view of a rounding plate having a structurally modified actuating mechanism.

The dough dividing machine, structurally improved according to this invention and shown in Figs. 1–2 by way of an example, comprises:

I. A machine frame 1—2 of ample rigidity.

II. A dough spreading and dividing device hereinafter described with all details, which is slidably mounted within the upper portion 2 of the machine frame for being moved up and down and being temporarily arrested automatically for longer or shorter periods of time in its upper and lower positions.

III. A dough treating viz. supporting and rounding table, described hereinafter with all details, which is slidably mounted on the lower portion 1 of the machine frame and adapted to perform a gyratory motion in response to a preceding downward motion and dividing action of the dough dividing device.

IV. Driving, actuating, interlocking, guiding, adjusting and controlling means, described hereinafter, for imparting the aforesaid motions to the dough dividing and rounding devices in constant succession and due sequence, for controlling their proper cooperation, and for automatically stopping the machine in case of failure to withdraw in time the dough carrier plate from the machine or to place a fresh dough carrier plate onto the machine.

The dough spreading and dividing device comprises: A spreader 45 and a divider 46, both of known design and being cooperatively associated with each other by a reciprocating shaft 44, fixed to the divider 46, and by selfacting locking means 50, 51, 52 designed and working on the order of those described in my United States Patent 1,859,762.

The latter comprise a notch formed at 50 in the shaft 44 for engagement by a spring loaded latch 51, fulcrumed on the upper plate of the spreader and cooperating with a wedge shaped key 52 (Fig. 2a), which reciprocates jointly with shaft 44; the latter is formed with a collar and is resiliently and slidably attached to a sleeve 4 enclosing a spring 53, which is adjustable as to its working pressure by a screw 55 and a contact and guide member 54.

Figure 10:
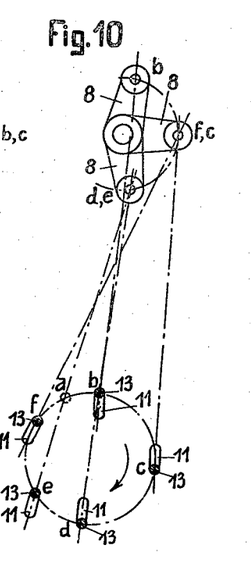
Figure 13:
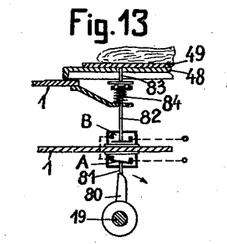
Figure 14:
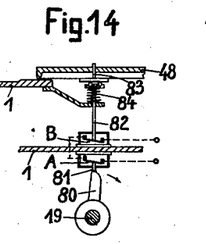

A quadrant gear wheel, indicated at 5, which meshes with a toothed rack 6 formed at the sleeve 4 (Fig. 1), and is keyed to a rocking crank shaft 7—8, by which the said sleeve 4 and the actuating shaft 44, slidably and resiliently mounted therein, receive their reciprocating movements up and down; on the said rocking shaft 7 double armed levers 40 are fulcrumed, which are free to swing up and down independently of shaft 7, and to which guide rods 3, 3' carrying the spreader 45 are linked at 3a; the weight of the spreader is almost entirely counterbalanced by weights 41 attached at the levers 40; this way of suspending the spreader 45 by means of balance weights is an import feature, because the spreader 45 is thus free to gradually rise during the rounding operation from its lowermost or closed position into a released position, shown in Figs. 1 and 2, in response to the increasing growth of the diameter of the pieces of dough under treatment; a spring catch 42, 43 of the ball-and-notch type for supporting the divider 46 in its uppermost position, namely when the crank shaft 7, 8 oscillates through such a large angle, shown in Fig. 10, that the quadrant 5 comes out of gear with tooth rack 6 of the sleeve 4.

A yoke 36 is bolted to the reciprocating shaft 44 for cooperation with the mould ring 47 and with the coupling mechanism of the rounding table 48; gravity actuated hooks in the form of bell crank levers 36a are pivoted to said yoke 36 for engaging and disengaging a flange projecting from the mould ring 47; dogs 36b are hinged to the frame 2, which are swung out of the path of levers 36a, when the divider 46 rises carrying with it the mould ring 47; the latter is disengaged from the hooked levers 36a, when the divider 46 begins its downward stroke, and drops upon the dough carrier plate 49 resting on the rounding table 4.

A shank 36' downwardly projecting from yoke 36a is formed thereon, which has a notched end for bearing against and inter-engaging itself with a spring loaded bolt 33—34; the latter is slidably mounted in a bushing 35 and provided at its upper end with a hooked catch 37 adapted to engage the notched end of shank 36'; bolt 34 snugly fits into and resiliently engages by means of said spring 33 and a nut a rocking lever fulcrumed at 28; the latter has a forked arm 29 engaging with its forked ends the mechanism for giving a gyratory motion to the dough rounding or treating table 48; as seen in Figs. 2 and 2b the latter is carried by cross shaped guide blocks 48a, 48b engaging guide notches 48', 48", which are formed on the upper face of frame 1 and at the bottom side of the rounding table 48 at right angles to each other.

The mechanism for imparting a gyratory motion to the rounding table 48 comprises: a rotary shaft 22, coupled with a prime mover for instance by means of a conical belt pulley 23 (Fig. 1) or a set of gear wheels 23' (Fig. 2), and being arranged in substantially vertical position, underneath the dough treating table 48; a coupling link in the form of a bell crank lever 24, 24' fulcrumed at the top of shaft 22 and linked by its upper arm 24 to a crank pin 27, which is rotatably mounted by means of a bushing in the hub of table 48; the lower arm 24' of said lever snugly fits into an eye piece downwardly projecting from a slotted disk 26, which is rotatably mounted within a crosshead 25 and secured in its position by a washer ring; crosshead 25 slidably engages guide pins, fixed in the frame 1, and is adapted to be bodily reciprocated in vertical direction by the forked lever 29, which engages pins 29', projecting from said cross head; on moving upwardly the crosshead 25 the coupling link 24, 24' is swung about its fulcrum into the inclined position shown in Fig. 2 and in turn the rounding table 48 is shifted from its normal or idle position—coaxially to shaft 22—into its working position—excentrically to shaft 22.

As long as the arm 24 of the coupling link is in its vertical or central position, the rounding table 48 remains rest, while crank pin 27 rotates idly about its own axis; by the time the coupling link 24, 24' reaches its inclined operative position, shown in Fig. 2, crank pin 27 is excentrically displaced and in turn the rounding table 48 is thereby gradually given a gyratory motion; the diameter of the circular path, along which the rounding table bodily moves during its gyratory motion can be adjusted by means of a rotary cam 31 and a handle 32 attached thereon (Figs. 1, 4).

The mechanism for actuating the spreading and dividing device comprises:

A rotary crank shaft 10, 13, 19, coupled by a worm gear 20—21 (Fig. 2) with the driving shaft 22, referred to above; and a pitman 9, which has a slotted or "lost-motion" section at 11 for engagement with pin 13 and is linked at 8' to the crank shaft 7, 8; the active length of said lost motion section 11, within which crank pin 13 is free to move, can be changed by an adjusting device comprising a sliding block 12 and a screw and nut gear 15, 16; the nut 15 is adapted to be revolved by a pair of bevel gear wheels and a handle 14.

By lengthening or shortening the active length of the lost motion section 11 of pitman 9 the rounding action, to which the divisional pieces of dough are subjected, is accordingly lengthened or shortened so as to suit best the specific nature of the dough under treatment, its greater or lesser plasticity etc.

Figures 9, 11, 12:
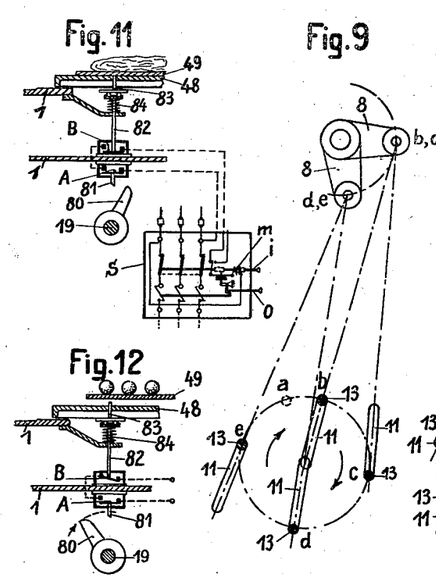
Figs. 9–10 are diagrams intended to elucidate the different positions and the cooperation of those machine elements, by which the mould is opened and closed and the rounding table is given a gyratory motion for a shorter or longer period of time.
Figs. 11–14 diagrammatically illustrate the construction and working of an electric safety device for automatically declutching the machine in case of irregularities.

When the lost motion section 11 of the pitman 9 is set for the greatest possible length the crank 8 for actuating the spreading and dividing device will move through a relatively small angle as seen in Fig. 9; while the crank pin 13 of rotary shaft 19 moves from e to b the crank 8 is swung upwardly with the result, that the spreading and dividing device 45, 46 is lifted from the rounding table 48; the latter is fully open and accessible to the operator, when the crank pin 13 reaches point a, indicated by a dotted circular line; the table 48 will remain open and accessible as long as crank pin 13 moves from a to c, that is in practice for an ample period of time, about 4–5 seconds, during which the plate 49 carrying the pieces of dough, which were rounded during the preceding complete working process, must be replaced by a fresh plate carrying the next following batch of dough.

The said fresh batch of dough is pressed and divided, while the crank pin 13 moves from c to d, and the divisional pieces of dough are rounded, while the crank pin 13 moves from d—e.

On comparing Figs. 9–10 as to the respective positions of point e it will be noted, that a greater length of the lost motion section 11 in pitman 9 makes for a longer rounding period d—e, and that reversely the rounding process is shorter in proportion to the shorter length of the said lost motion section.

It will further seen from Fig. 10, that also in cases, when the machine is set for working with a shorter rounding period, immediately after the rounding action is finished crank 8 is swung upwardly past points f and a, where the table 48 becomes accessible,—and into a much higher position b' than in the case of Fig. 9; while crank 8 swings from f to b' and back the quadrant 5 is out of gear with the tooth rack 6 and the spreader and divider 45, 46 are meanwhile supported by auxiliary means such as a spring catch 42—43, referred to above.

The dough dividing and rounding machine improved according to this invention is provided with a safety device, shown in Figs. 1, 11 to 14, for automatically stopping the machine to run in case of failure to timely put a fresh plate 49 carrying the next following batch of dough into the machine;—said safety device comprises an auxiliary electric circuit marked by dash lines at E, a master switch S of known design for closing and breaking an electric power circuit, which is adapted to be worked manually and electromagnetically and which presents by itself alone no specific part of this invention, and double break switch of special design:

Said master switch S comprises, a manually operable push bar i for losing the electric three-phase power circuit, on which the electric motor M (Fig. 2), runs; another push bar o for manually breaking said electric power circuit, and an electromagnet m, by which the electric power circuit is automatically broken in cases of danger in response to the closing of the auxiliary circuit E.

According to this invention a self-acting double break switch is provided for closing said auxiliary circuit E, of which some characteristic phases of operation are shown in Figs. 11—14 of the drawings and which comprises, two spring loaded contact keys A and B, which are stationarily fixed in the machine frame 1 above the rotary shaft 19 and are connected in series with the auxiliary circuit E, and two contact plates connected with each other for cooperation with said keys A and B; a thrust bolt 81 having a bevelled end and being fixed to contact key A for cooperation with a thumb 80, which is keyed to the rotary shaft 19 in such position, that contact is made by key A in regular intervals just before crank pin 13 reaches point c, that is before the spreader and divider 45, 46 start on their downward stroke; another thrust bolt 82 attached to the upper contact key B and being loaded by a coil spring 84, which rests on a bracket of the machine frame; said spring 84 resiliently supports a ball bearing having an upper and a lower plate and being so designed, that a feeler 83, which is fixed to the upper plate of the ball bearing and slidably fits into a hole in the rounding table 48 is free to follow the gyratory movements of the rounding table 48.

As long as the feeler 83 is pressed down by a carrier plate 49 contact key B is kept in its inoperative position shown in Fig. 11. It will be noted from Figs. 12 and 13, that the double break switch A—B described does not close the auxiliary circuit E, after the carrier plate 49 with the rounded pieces of dough has been withdrawn and replaced by another plate 49 but only in case the operator has accidentally omitted to place in due course a fresh carrier plate 49 on the machine, (Fig. 14) namely by the time the machine is just about to start a new cycle of spreading, dividing and rounding operations.

The safety device described, wherein an auxiliary electric circuit E and a double break switch and a master switch S are used, may be structurally modified to advantage in such manner, that the electric power circuit is also automatically broken in cases, where the operator fails to timely withdraw the carrier plate 49 with the rounded pieces of dough thereon.

Figure 15:
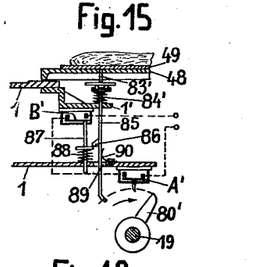
Figs. 15–18 show another electric safety device of modified design.
Figure 16:
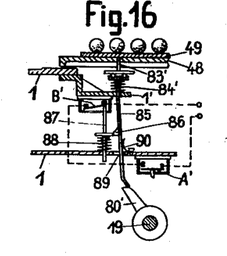
Figure 17:
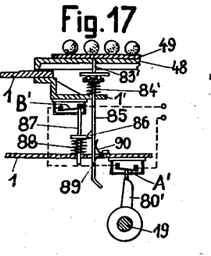
Figure 18:
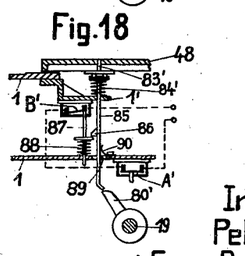

Figs. 15–18 show a double break switch of special design, by which this is accomplished, and which comprises a thumb 80' keyed to the rotary shaft 19 for cooperation with a spring actuated contact key A', whereby the latter is closed periodically (Fig. 17) in the same manner as described with reference to Figs. 11–14; a resilient contact key B' engaged by a thrust rod 87, which is loaded by a spring 88 (Fig. 15), the latter bearing against a collar fixed to said thrust rod 87 and being supported by the machine frame I; through a hole in frame I the said thrust rod 87 slidingly passes and is guided therein; another thrust rod 85, which being under the control of springs 84' and 90, is slidingly guided in a hole of bracket I' and snugly fits in a slot 89 in the machine frame I, so as to be capable of being resiliently depressed by reciprocal cooperation of spring 84' and a feeler 83'—which exactly correspond in their function to that of spring 84 and feeler 83 described above with reference to Figs. 11–15—and of being thrown aside, when being in its lower position (Figs. 15–16), by engagement with thumb 80', so as to disengage the catch 86 and the collar of rod 87.

It will be seen from Figs. 16–17, that, whenever carrier plate 49 remains untimely in its place, thumb 80' will cause the contact key B' to be thrown into its closed position, and that since contact A' is likewise in its closed position the result is, that the power circuit is electromagnetically broken by the closed auxiliary circuit E in both cases, namely when carrier plate 49 has not been withdrawn up to the last possible moment, (Fig. 17), or when a fresh carrier plate has not been placed on the rounding table 48 of the machine (Fig. 18) by the time the spreading and dividing devices start on their downward stroke.

Various other modifications may be conveniently made in the structural details of dough dividing and rounding machines of the improved design described above without substantially departing from the spirit and the salient ideas of this invention.

Figure 3:
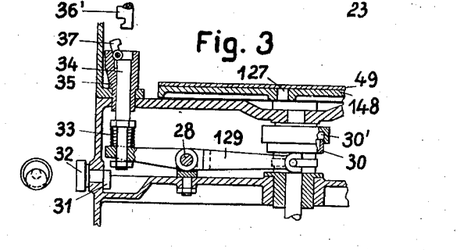
Fig. 3 is a fragmentary elevation of a structurally modified mechanism for imparting gyratory motion to the rounding table.
Figure 5:
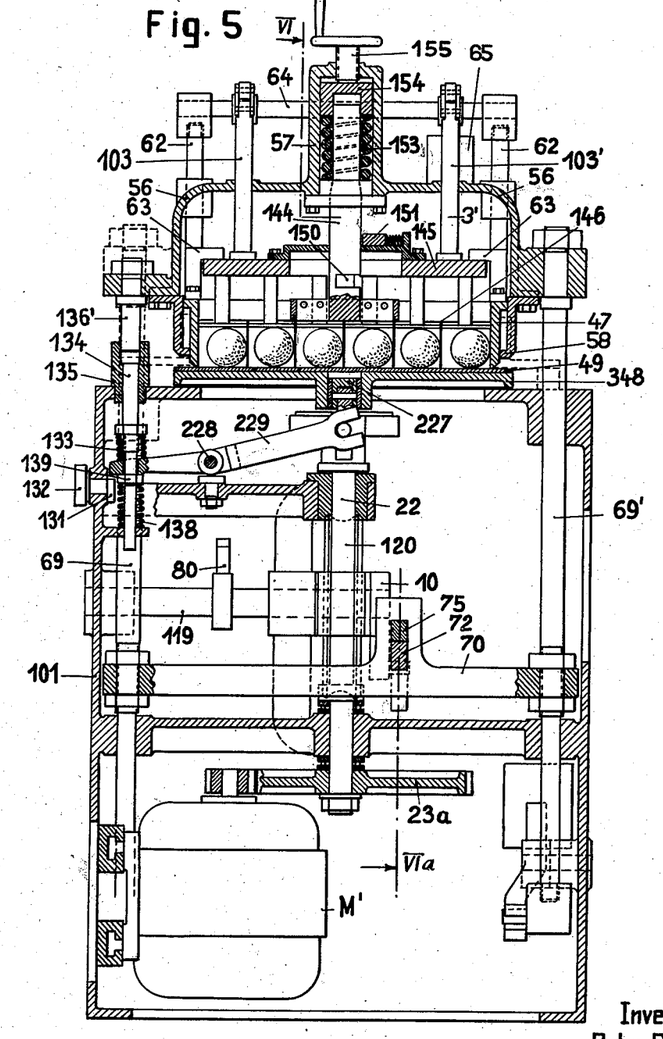
Fig. 5 is a section taken vertically on line V in Fig. 6 through a structurally modified machine designed according to this invention.

Structurally modified mechanisms for imparting a gyratory motion to the rounding table 48 are shown in Figs. 3 and 4;

The mechanism shown in Fig. 3 comprises, a forked lever 129, fulcrumed at 128 on the machine frame and being cooperatively associated with the notched shank 36' through the connecting members described above, namely spring 33, bolt 34, bushing 35, and a catch 37 hinged to said bolt; a friction clutch, of which the driving member 30 is axially slidable on rotary shaft 22, by means of a feather-and-slot gear (not shown), while the driven member 30' is journalled in the machine frame and formed with a disc having a crank pin 127 attached, which engages the rounding table 148.

The provision of a friction clutch 30, 30' insures a gentle engagement and setting into motion of the rounding table 148 through its actuating mechanism without shocks, which is a desirable feature because the frictional resistance offered by the divisional pieces of dough to the rounding table 148 has its maximum value at the beginning and during the early part of the rounding operation; said resistance greatly exceeds the resistance presented by the pieces of dough during the rest of the rounding operation.

For the same reasons the main driving shaft 22 should be provided with an energy storing element or power accumulator, such as a rather heavy and massy rim indicated at 23" in Fig. 1, which is formed at the pulley 23 and enables the latter to act as a fly-wheel.

Because of the power stored within said pulley 23, 23" the major part of the relatively large energy required during the early stage of the rounding operation is supplied by said pulley 23 itself—viz. not by the electric driving motor or other prime mover;—hence a smaller size and cheaper motor M will suffice for doing the work, which may be chosen consistently with the average load but not for the peak loads occurring only during the aforesaid limited working periods of the machine.

Other advantages accruing from the fly-wheel action of pulley 23, 23" consist therein, that the working of the machine is equalized also during the spreading and dividing operations and is rendered more uniform with consequent reduction of wear and noise.

The structurally modified mechanism for imparting a gyratory motion to the rounding table 248 shown in Fig. 4 comprises, a bell crank lever 124 fulcrumed on the top end of rotary shaft 22 and being pivotally connected with a crank pin 127, which is rotatably mounted within the hub of table 248; the lower arm of lever 124 slidably engages by means of a ball bearing 124' an annular groove formed internally of a crosshead 125; the latter slidably engages guide pins and is adapted to be bodily reciprocated by a rocking lever (not shown), which engages pins 129', laterally projecting from the crosshead 125.

On being moved upwardly the crosshead 125 will swing the bell crank lever 124 into an inclined position, in which the crank pin 127 is excentrically displaced relatively to the rotary shaft 22 and the table 248 is thus given a gyratory motion.

In Figs. 5–8 of the drawings a dough dividing and rounding machine of improved design is shown exhibiting additional important features of this invention.

Reviewing the working of the spreading and dividing device, described with reference to Figs. 1–2, 9–10 and briefly called henceforth "divider"; it will be recalled, that, the actuating mechanism for raising and lowering the divider is purposely so designed, that the latter ascends from its lowermost position immediately after the rounding operation is finished, and that on reaching its upper dead point position the divider is temporarily arrested with the object of leaving an ample period of time—or in other words—of producing a prolonged interval—during which the rounding table 48 is open and accessible, so that the operator can replace at ease the carrier plate 49 with the rounded pieces of dough by the next following dough carrier plate.

In the embodiment of the invention shown in Figs. 1–2 the said prolonged interval is created by a mechanism comprising a rotary crank 10—13, an oscillating crank 8, 8' and a pitman 9, the latter cooperatively interconnecting said cranks and having a "lost-motion" section 11 of variable length.

Other means, mechanism or expedients for producing the said prolonged interval may be conveniently provided, as shown hereinafter.

For instance instead of raising the divider into an upper dead-point position just sufficiently high as to render the rounding table 48 accessible the divider may be raised to a still higher dead point position—higher than strictly necessary and required for the accessibility of the rounding table 48—the ultimate object being the same: to gain time in favor of the operator until the divider re-descending blocks the rounding table.

A dough dividing and rounding machine, redesigned with the object of raising the divider into an abnormally high upper position, is shown in Figs. 5-8 and comprises, a frame 101, an electric motor M', with which the main driving shaft 120 is coupled by means of a set of gear wheels 23a; an auxiliary shaft 119, coupled with the shaft 120 through a worm gear (not shown) and having keyed to it a crank 110, the pin 113 of which engages a slotted lever 72, 73 fulcrumed at 78 on the frame 101; the slotted section 73 of lever 72 is curved in its middle portion in such manner, that the lever 72 remains at rest, while the crank pin 113 moves along said curved portion (Fig. 6), the divider then being in its lower position; a crosshead 70 having a slotted central portion 71, the latter snugly fitting over the rocking lever 72 and a wedge shaped key 75, which is slidably and adjustably mounted thereon by means of a guide member 74 and a screw-and-nut gear 76, the latter having a handle 77 attached; connecting rods 69, 69' slidably mounted in the machine frame 101, which are adjustably fixed at their lower ends to said crosshead 70 and at their upper ends to the housing 156 of the divider. which is described in detail hereinafter.

Figures 8, 8A:
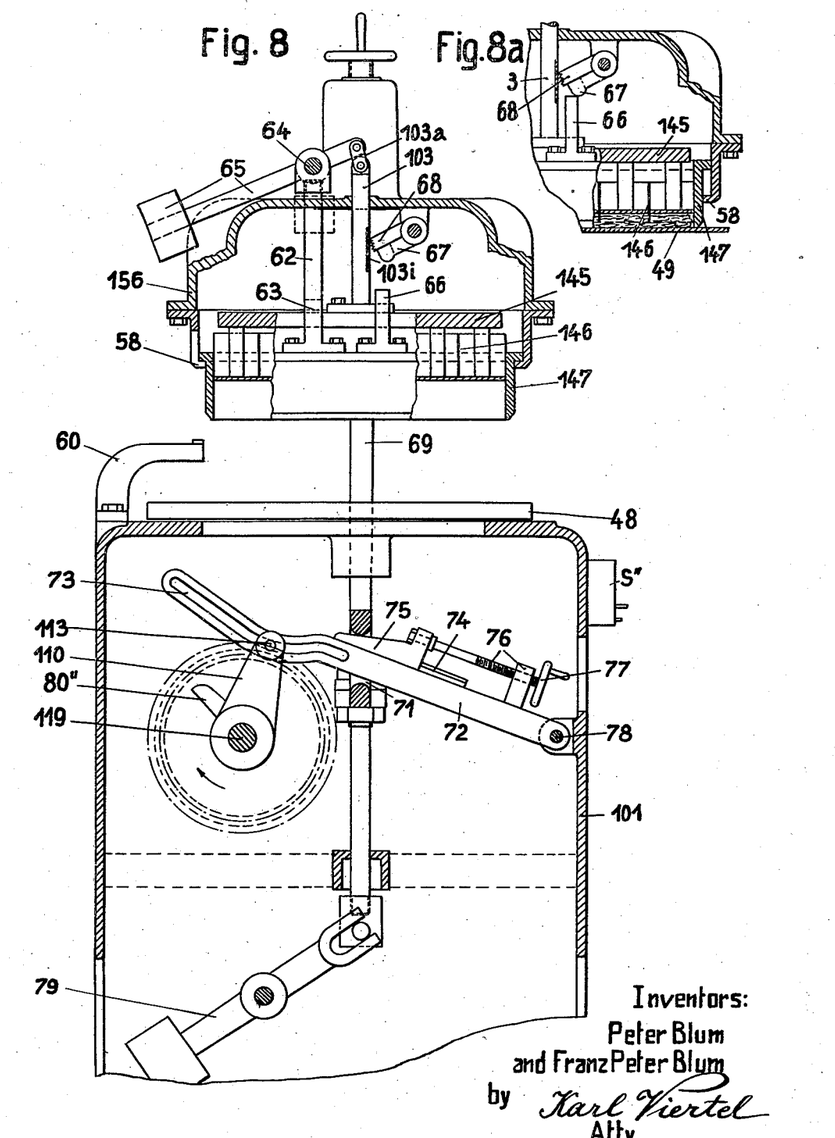
Fig. 8 is a fragmentary section taken vertically through the dough dividing and rounding machine of Figs. 5–7, the press mould and divider being in elevated position.
Fig. 8a shows the divider in its lower position.

It will be noted more especially from Fig. 8, that there is no upper frame comparable to frame 2 of Fig. 1 for guiding the divider in its reciprocating movements, the only guide members being the connecting rods 69, 69'.

The divider comprises, a spreader of known design consisting of an upper plate 145 and a lower plate, which are spaced from each other and are slidably fixed within the housing 56 by means of guide rods 103, 103'; weighted levers 65, linked to the upper ends of said guide rods at 103a' and fulcrumed on a shaft 64, which is carried by supports 62 fixed to the mould ring 147; the spreader 145 is counterbalanced to practically its full weight by said weighted levers 65; by a nose 63 projecting from supports 62 (Figs. 5–6) the movements of the spreader 145 in upward direction are controlled; a divider proper 146 presenting a net work of knives of known design and being cooperatively associated with the spreader 145 and with its actuating mechanism in a manner widely known; a mould ring 147 formed with a flange at its upper end, and being slidably mounted within a flanged ring 58, which is attached at the bottom of housing 56 for cooperation with mould ring 147; as seen in Fig. 8 the latter is carried by said ring 58, while the divider rises into its upper position; on being lowered the flange of the mould ring comes into engagement with a plurality of stops 60, of which only one is shown in Fig. 8, and which keep the mould ring 147 out of direct contact with the rounding table 348.

Figure 6:
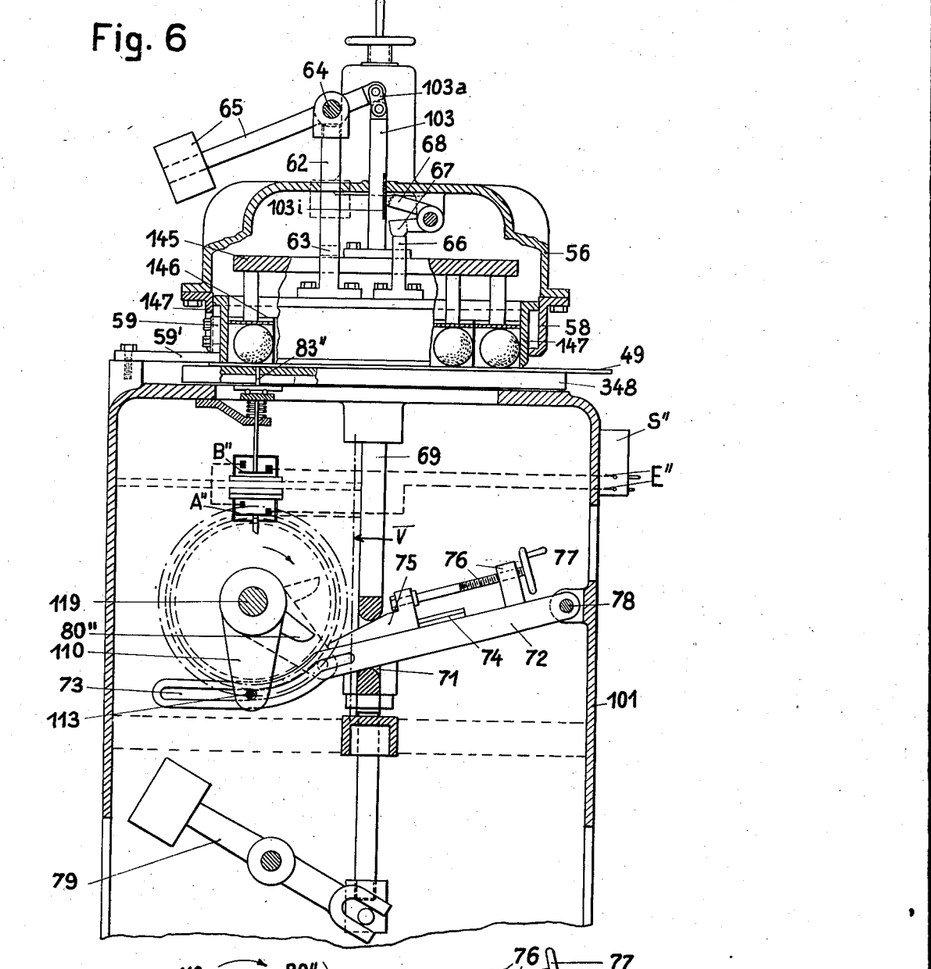
Fig. 6 is a fragmentary section taken vertically on lines VI, VIa in Fig. 5 through the machine of Fig. 5 and in planes at right angles to that of Fig. 5.

Fig. 6 shows a structurally modified arrangement, in which the mould ring 58 is formed with noses 59 laterally projecting therefrom and cooperating with stops 59', which support the mould ring 147 in its operative position.

The mechanism cooperatively interconnecting the spreader 145, divider 146 and mould ring 147 with each other and with the housing 56 and the rounding table 348 comprises a shaft 144 notched at 150, which is resiliently held within a hood 57 of housing 56 by a spring 153, the tension of the latter being capable of adjustment by means of a screw 155 and a disc 154; a spring loaded latch 151 fulcrumed on the spreader 145 and being cooperatively associated with the notched shaft 144, 150 and with a wedge shaped releasing key (not shown), attached to shaft 144, as described above with reference to 52 in Figs. 2 and 2a; a contact bolt 136' secured to the housing 56 (Fig. 5) for engagement with a thrust bolt 134, which is slidably mounted in a guide member 135 of frame 101; to said thrust bolt 134 a forked lever 229, fulcrumed at 228, is resiliently attached by means of springs 133, 138 and a nut 139; by a rotary cam 131 having a handle 132 attached for being set in different positions (see Fig. 3) the movements of the lever 229 and in turn the excentric displacements of a crank pin 227 are controlled: Crank pin 227 corresponds as to its design and cooperation with the rounding table 348, with the rotary shaft 120 and lever 229 exactly to pin 27 described above with all details and with reference to 24, 25, 26 of Figs. 1 and 2: It will be recalled that in accordance to the excentric displacement of said crank pin the rounding table is given a gyratory motion, which gradually increases as to the diameter of the circular path, in which the rounding table moves.

Referring once more to the operation of the spreader 145, described above, it will be recalled that the spreader is released during the dividing operation and must be lifted immediately thereafter in order to provide ample play for the pieces of dough rapidly growing in diameter on being rounded and transformed into balls; I have found in the course of my practical work, that it is very important, that the spreader should be forcibly lifted, namely by positively acting means, instead of simply relying on the counterbalancing action and lifting tendency of the weighted levers 65; I have found, that within the narrow slots of the press plate of the spreader, through which the knives of the divider 146 pass to and fro considerable frictional resistance occurs because of the absence of a lubricating medium within said slots and of the presence of a sticky, adhesive, non-lubricating medium—dough, and that by said frictional resistance the lifting action of the weighted levers 65 upon the spreader 145 is greatly impaired.

With the object of insuring a speedy lifting of the spreader 145 in a reliable and positive manner I prefer to provide a selfacting mechanism shown by way of an example in Fig. 6, which comprises, a pair of superimposed levers 67, 68 fulcrumed in the housing 56, of which the upper lever 68 is geared with a toothed portion 103i of rod 103 attached to spreader 145; the lower lever 67 is adapted to impart a lifting motion to the upper lever 68 and in turn to the rod 103 on coming into contact with a stud 66 (Figs. 8, 8a) attached to mould ring 147, when the housing 156 descends.

A weighted lever 79 fulcrumed on the machine frame may be conveniently provided for counterbalancing the weight of the divider as seen in Fig. 6.

After the lifting of the spreader 145 has been positively initiated by the cooperation of stud 66, levers 67, 68 and rod 103, 103i the lifting action is completed by the weighted levers 65 whereupon the parts concerned will be in the position shown in Fig. 6.

The selfacting electric safety device shown in Fig. 6, of which the principal parts—feeler, contact keys, auxiliary circuit and master switch—are indicated at 83", A", B", E", S" corresponds in its cooperation with the dough carrier plate 49 and a rotary thumb 80" exactly to that described above with reference to Figs. 1, 11–14.

Briefly summarizing the operation of the machine shown in Figs. 5–8:

While the crank 110 revolves with the rotary shaft 119 from its lower position, shown in Fig. 6, into its upper position, shown in Fig. 8, the divider is simultaneously raised by the lever 72, crosshead and connecting rods 69, 69' into its idle position, in which the divider knives 146 are retracted into the spreader 145; meanwhile the plate 49 carrying the divisional pieces of dough, which were divided and rounded during the last cycle of working operations of the machine, should have been withdrawn and a fresh carrier plate 49 with next following batch of dough been put onto table 348.

While the crank 110 revolves from its upper position shown in Fig. 8 into the position indicated by dash lines in Fig. 6 the divider descends into its operative position; during the descent of the divider first the mould ring 147 strikes with its noses 59 against the stops 59' (Fig. 6) and is thereby arrested; thereupon the press plate of spreader 145 comes into contact with the dough (Fig. 8a) and transforms the latter into a disc of uniform thickness; by the pressure exerted thereby upon the spreader 145 and the consequent compression of spring 153 latch 151 is automatically released, whereupon the divider knives 146 passing out of the spreader 145 will be protruded into the dough by the shaft 144 descending jointly with hood 156, and eventually contact bolt 136' engaging thrust bolt 134 will cause the table 348 to be given a gyratory motion.

As explained above, shortly before the descent of the divider hood 156 is finished, the spreader 145 is positively lifted thus allowing the divisional pieces of dough to freely grow in diameter while being rounded and transformed into balls.

Figure 7:
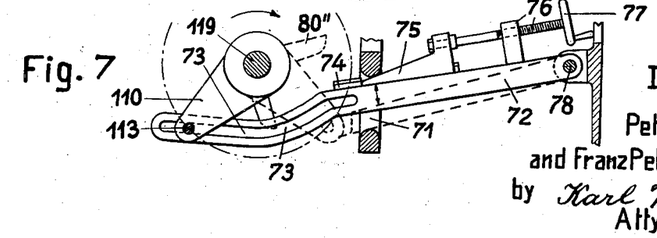
Fig. 7 is a side elevation showing some details of the actuating means of the press mould and divider as set for a relatively long subsequent rounding operation.

The divider remains in its lowermost position while pin 113 of crank 110 moves within the arc shaped portion of slot 73 of lever 72; however by withdrawing the wedge 75 to a greater or smaller extent from the slot 71 of crosshead 70 and thus producing a "lost-motion" action of the lever 72 as seen in Fig. 7, comparable to that, which was described with reference to pitman 9 and its slotted section 11 shown in Figs. 1–2, 9–10, the rounding operation may be extended (Fig. 7) or shortened (Fig. 6), so as to suit the specific plasticity or other properties of the dough under treatment and attain the best results.

What we claim is:—

1. In a dough dividing and rounding machine the combination with a machine frame, of a dough treating table, carried by said frame, and being adapted to periodically perform gyratory movements, a dough dividing device, adapted to be reciprocated toward and from said table for cooperation therewith, a main drive shaft, actuating means for alternately imparting to said dividing device and said dough treating table their respective movements in successive closed cycles of operation, said actuating means comprising a rotary crank shaft coupled with said main driving shaft by a reduction gear, an oscillating crank shaft for actuating the dough dividing device, a pitman cooperatively interconnecting said crank shafts and being formed with a lost-motion section, and adjusting means for changing the active length of said lost-motion section, said main drive shaft being continuously driven and in constant engagement with said actuating means.

2. In a dough dividing and rounding machine the combination with a machine frame, of a dough treating table, carried by said frame, and being adapted to periodically perform gyratory movements, a dough dividing device, adapted to be reciprocated toward and from said table for cooperation therewith, and actuating means for alternately imparting to said dividing device and said dough treating table their respective movements in successive closed cycles of operation, said actuating means comprising a main driving shaft, a rotary crank shaft coupled with said main driving shaft by a reduction gear, a rocking crank shaft for actuating the dough dividing device, a pitman cooperatively interconnecting said crank shafts and being formed with a lost-motion section, and adjusting means for changing the active length of said lost-motion section,—said adjusting means comprising a block slidingly mounted in said section and a screw-and-nut gear for displacing said block.

3. In a dough dividing and rounding machine the combination with a machine frame, of a dough treating table, carried by said frame, and being adapted to periodically perform gyratory movements, a dough dividing device, adapted to be reciprocated toward and from said table for cooperation therewith, a main drive shaft, actuating means for alternately imparting to said dividing device and said dough treating table their respective movements in successive closed cycles for operation, said actuating means comprising a rotary crank shaft coupled with the former by a reduction gear, a rocking lever, having a slotted section for cooperation with said crank shaft, a crosshead having a lost-motion section and engaging thereby the said rocking lever, rods interconnecting said crosshead and dividing device, and adjusting means for changing the active length of the lost-motion section of the crosshead, said main drive shaft being continuously driven and in constant engagement with said actuating means.

4. In a dough dividing and rounding machine the combination with a machine frame, of a dough treating table, carried by said frame, and being adapted to periodically perform gyratory movements, a dough dividing device, adapted to be reciprocated toward and from said table for cooperation therewith, and actuating means for alternately imparting to said dividing and said dough treating table their respective movements in successive closed cycles for operation, said actuating means comprising a main driving shaft, a rotary crank shaft coupled with the former by a reduction gear, a rocking lever, having a slotted section for cooperation with said crank shaft, a crosshead having a lost-motion section and engaging thereby the said rocking lever, rods interconnecting said crosshead and dividing device, and adjusting means for changing the active length of the lost-motion section of the crosshead,—said adjusting means comprising a wedge shaped key slidingly mounted on the said rocking lever so as to project into said lost-motion section of the cross-head, and a screw and nut gear for displacing said key.

5. In a dough dividing and rounding machine the combination with a machine frame, of a dough treating table, carried by said frame, and being adapted to periodically perform gyratory movements, a dough dividing device, adapted to be reciprocated toward and from said table for cooperation therewith, and actuating means for alternately imparting to said dividing device and said dough treating table their respective movements in successive closed cycles of operation,—a plurality of guide notches being formed in said machine frame and at the bottom side of the dough treating table respectively at right angles to each other, and cross shaped guide blocks being provided, fitting into said notches and slidingly supporting the dough treating table.

6. In a dough dividing and rounding machine the combination with a machine frame, of a dough treating table, carried by said frame, and being adapted to periodically perform gyratory movements, a dough dividing device, adapted to be reciprocated toward and from said table for cooperation therewith, and actuating means for alternately imparting to said dividing device and said dough treating table their respective movements in successive closed cycles of operation,—the dough treating table being cooperatively associated with a rotary shaft arranged underneath the latter in substantially vertical direction thereto, a coupling link fulcrumed at the top of said shaft so as to rotate with the latter and to be capable of being tilted from a vertical position, coaxial to the said shaft, into an inclined position, a crank pin engaging the dough treating table and being pivotally attached to said coupling link, and means for tilting the latter.

7. In a dough dividing and rounding machine the combination with a machine frame, of a dough treating table, carried by said frame, and being adapted to periodically perform gyratory movements, a dough dividing device, adapted to be reciprocated toward and from said table for cooperation therewith, and actuating means for alternately imparting to said dividing device and said dough treating table their respective movements in successive closed cycles of operation, the dough treating table being cooperatively associated with a rotary shaft arranged underneath the latter in substantially vertical direction thereto, a coupling link fulcrumed at the top of said shaft so as to rotate with the latter and to be capable of being tilted from a vertical position, coaxial to the said shaft, into an inclined position, a crank pin engaging the dough treating table and being pivotally attached to said coupling link, and means for tilting the latter,—said tilting means comprising an actuating arm angularly attached to said coupling link, a crosshead engaging said actuating arm and being adapted to be bodily reciprocated, and means for reciprocating said crosshead.

8. In a dough dividing and rounding machine the combination with a machine frame, of a dough treating table, carried by said frame, and being adapted to periodically perform gyratory movements, a dough dividing device, adapted to be reciprocated toward and from said table for cooperation therewith, and actuating means for alternately imparting to said dividing device and said dough treating table their respective movements in successive closed cycles of operation, the dough treating table being cooperatively associated with a rotary shaft arranged underneath the latter in substantially vertical direction thereto, a coupling link fulcrumed at the top of said shaft so as to rotate with the latter and to be capable of being tilted from a vertical position, coaxial to the said shaft, into an inclined position, a crank pin engaging the dough treating table and being pivotally attached to said coupling link, and means for tilting the latter, said tilting means comprising an actuating arm angularly attached to said coupling link, a crosshead engaging said actuating arm and being adapted to be bodily reciprocated, and means for reciprocating said crosshead,—said reciprocating means comprising a forked lever fulcrumed on the machine frame and engaging said crosshead, a coupling bolt resiliently engaging said forked lever, and a contact bolt attached to the dividing device for cooperation with said coupling bolt.

9. In a dough dividing and rounding machine the combination with a machine frame, of a dough treating table, carried by said frame, and being adapted to periodically perform gyratory movements, a dough dividing device, adapted to be reciprocated toward and from said table for cooperation therewith, and actuating means for alternately imparting to said dividing device and said dough treating table their respective movements in successive closed cycles of operation,—said dough treating table being cooperatively associated with a rotary shaft arranged in substantially vertical direction thereto, means for temporarily coupling said rotary shaft with the dough treating table so as to impart to the latter gyratory movements, and a pulley keyed to said rotary shaft and having a relatively heavy rim formed thereon so as to act as a fly-wheel.

10. In a dough dividing and rounding machine the combination with a machine frame, of a dough treating table, carried by said frame, and being adapted to periodically perform gyratory movements, a dough dividing device, adapted to be reciprocated toward and from said table for cooperation therewith, and actuating means for alternately imparting to said dividing device and said dough treating table their respective movements in successive closed cycles of operation,—said dough dividing device comprising a mould ring, formed with a flange at its upper end, a divider knife and a spreader slidably arranged within said mould ring, a reciprocating housing formed with a flange for engagement with said mould ring, so as to lift and lower the latter, a shaft slidably mounted within said housing and engaging said spreader and divider, spring controlled means for disengaging the spreader from said shaft when the dough has been spread out and is under pressure, and means for positively lifting the spreader from the divided dough.

11. In a dough dividing and rounding machine the combination with a machine frame, of a dough treating table, carried by said frame, and being adapted to periodically perform gyratory movements, a dough dividing device, adapted to be reciprocated toward and from said table for cooperation therewith, and actuating means for alternately imparting to said dividing device and said dough treating table their respective movements in successive closed cycles of operation,—said dough dividing device comprising a mould ring, formed with a flange at its upper end, a divider knife and a spreader slidably arranged within said mould ring, a reciprocating housing formed with a flange for engagement with said mould ring, so as to lift and lower the latter, a shaft slidably mounted within said housing and engaging said spreader and divider, spring controlled means for disengaging the spreader from said shaft when the dough has been spread out and is under pressure, and means for positively lifting the spreader from the divided dough,—said lifting means comprising a guide rod, attached to the spreader and slidingly associated with the said housing, a tooth rack being formed at said guide rod, a stud fixed on said mould ring and levers fulcrumed in the said housing for cooperation with the said stud and guide rod, namely lifting the latter and in turn the spreader, when the housing approaches its lowermost position.

12. In a dough dividing and rounding machine the combination with a machine frame, of a dough treating table, carried by said frame, and being adapted to periodically perform gyratory movements, a dough dividing device, adapted to be reciprocated toward and from said table for cooperation therewith, and actuating means for alternately imparting to said dividing device and said dough treating table their respective movements in successive closed cycles of operation,— the dough treating table being provided with self-acting means for throwing the machine out of operation in cases of failure to put a fresh dough carrier plate on the empty dough treating table.

13. In a dough dividing and rounding machine the combination with a machine frame, of a dough treating table, carried by said frame, and being adapted to periodically perform gyratory movements, a dough dividing device, adapted to be reciprocated toward and from said table for cooperation therewith, and actuating means for alternately imparting to said dividing device and said dough treating table their respective movements to successive closed cycles of operation, the dough treating table being provided with self-acting means for throwing the machine out of operation in cases of failure to put a fresh dough carrier plate on the empty dough treating table,—said self-acting means comprising an electric power circuit, an electric motor, connected with said power circuit, a rotary shaft driven by said motor, an electric auxiliary circuit, a master switch adapted to electromagnetically break the said power circuit, a double break switch having two spring loaded contact keys, which are arranged in series to each other for making and breaking said auxiliary circuit, a feeler bolt attached to one of said keys for cooperation with the dough carrier plate respectively, a contact bolt attached to the other contact key, and a rotary thumb fixed on said rotary shaft.

PETER BLUM.
FRANZ PETER BLUM.